United States Patent
Yabusaki et al.

[11] Patent Number: 6,070,488
[45] Date of Patent: Jun. 6, 2000

[54] VEHICLE PEDAL DISPLACEMENT CONTROL STRUCTURE

[75] Inventors: Naoki Yabusaki, Toyota; Hiroshi Isono, Susono; Minoru Nakajima, Toyota, all of Japan

[73] Assignee: Toyota Jidosha Kabushiki Kaisha, Toyota, Japan

[21] Appl. No.: 09/078,566

[22] Filed: May 14, 1998

[30] Foreign Application Priority Data

May 23, 1997 [JP] Japan ..................................... 9-133861

[51] Int. Cl.[7] .............................. G05G 1/14; B60K 28/14
[52] U.S. Cl. ............................................. 74/512; 180/274
[58] Field of Search ........................... 74/512, 513, 560; 180/274, 275, 335

[56] References Cited

U.S. PATENT DOCUMENTS 5,848,558 12/1998 Isono et al. ................................ 74/512

FOREIGN PATENT DOCUMENTS

| 3307887 | 9/1984 | Germany | 74/512 |
| 39 04 616 A1 | 8/1989 | Germany. | |
| 43 05 290 A1 | 9/1993 | Germany. | |
| 4409235 | 10/1994 | Germany | 180/274 |
| 4409285 | 10/1994 | Germany | 180/274 |
| 1-73464 1 | 5/1989 | Japan. | |
| 9-11826 | 1/1997 | Japan. | |

*Primary Examiner*—Mary Ann Battista
*Attorney, Agent, or Firm*—Oliff & Berridge, PLC

[57] ABSTRACT

A pedal bracket is divided into a main bracket and a sub-bracket. The main bracket and the sub-bracket are connected by a mounting bolt and a nut, the mounting bolt serving as a supporting shaft of a swing link which connects a brake pedal and a push rod. When an external force of a predetermined value or greater is applied to the front of the vehicle, an extending portion of the sub-bracket is pressed by the main bracket and swings substantially rearward of the vehicle and a clevis at the end of the push rod is forced in substantially toward the front side of the vehicle by a front surface of the extending portion. Accordingly, the brake pedal swings around a mounting bolt substantially toward the front side of the vehicle via the swing link and the like and a pedal pad is displaced substantially toward the front side of the vehicle.

14 Claims, 5 Drawing Sheets

VEHICLE PEDAL DISPLACEMENT CONTROL STRUCTURE

BACKGROUND OF THE INVENTION

1. Field of the Invention

The present invention relates to a vehicle pedal displacement control structure.

2. Description of the Related Art

There have conventionally been considered various structures as a countermeasure taken when an external force of a predetermined value or greater is applied to the front of a vehicle. As an example of this kind of countermeasures, there can be mentioned a structure disclosed in Japanese Utility Model Application Laid-Open (JP-U) No. 1-73464.

Figure 5:
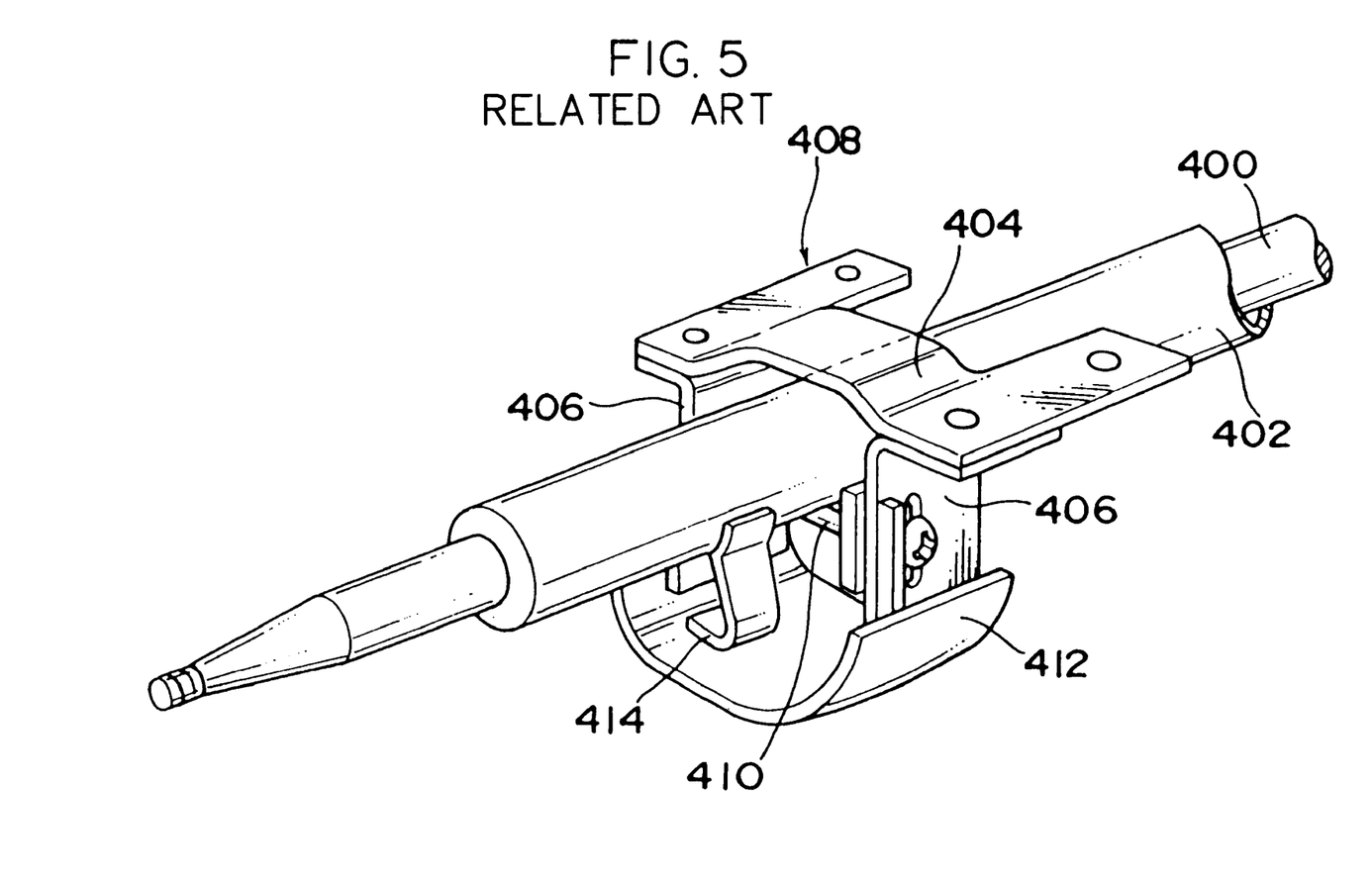
FIG. 5 is a perspective view which shows a conventional structure.

In brief, as shown in FIG. 5, in the structure disclosed in the above publication, a steering column 402 which surrounds a steering shaft 400 passes through between a tilt bracket 408 having an upper plate member 404 and a pair of side plate members 406, and these side plate members 406, and is supported at the side of a vehicle body by a shaft 410 which supports the lower edge of the steering column 402.

Further, a knee protector 412 having a substantially circular arc shape and provided to be elastically deformable is disposed at the lower side of the above-described tilt bracket 408. The knee protector 412 is elastically supported at the side of the lower edge of the steering column 402 via an elastically deformable stay 414.

According to the above-described structure, when an external force of a predetermined value or greater is applied to the front of the vehicle, a vehicle occupant (i.e., a driver) is about to move inertially toward the front of the vehicle, and accompanied therewith, the legs of the driver are forced to move inertially in the same direction while bending, with the knees as the starting points. For this reason, in the case in which no knee protector 412 is provided, the driver's knees may contact the tilt bracket 408. However, so long as the knee protector 412 is disposed below the tilt bracket 408 as described above, the driver's knees merely contact the knee protector 412.

It seems that the structure having such a knee protector 412 is useful as a countermeasure taken when an external force of a predetermined value or greater is applied to the front of the vehicle. However, it is possible to approach from another point of view as the above countermeasure in relation to the driver's legs, and further, it is important to establish the countermeasure multilaterally in relation to the driver's legs from the view point of multi-protection.

As a result of repetition of experiments conducted based on such a point of view, the present inventors have come to a conclusion that control of displacement of a vehicle pedal such as a brake pedal in view of deformation of a body panel and the like, and behaviors against the deformation when an external force of a predetermined value or greater is applied to the front of the vehicle be established as a quite effective countermeasure.

SUMMARY OF THE INVENTION

In view of the above-described circumstances, it is an object of the present invention to provide a vehicle pedal displacement control structure which can control displacement of the tread of a vehicle pedal when an external force of a predetermined value or greater is applied to the front of a vehicle.

A vehicle pedal displacement control structure according to the present invention comprises: a suspension-type vehicle pedal which is swingably supported between members which constitute a portion of a vehicle body, which are disposed apart from each other substantially in the longitudinal direction of the vehicle and which are displaced relatively so as to reduce a distance therebetween substantially in the longitudinal direction of the vehicle when an external force of a predetermined value or greater is applied to the front of a vehicle, the vehicle pedal including, at a lower end thereof, a tread to which stepping force of a driver is applied; stepping force transmission means which connects the vehicle pedal and hydraulic pressure conversion means for converting the stepping force applied to the tread to hydraulic pressure to transmit the stepping force to the hydraulic pressure conversion means; and displacement control means disposed between the members which constitute a portion of a vehicle body, the displacement control means swinging due to relative displacement of the members which constitute a portion of a vehicle body and pressing a portion of the stepping force transmission means disposed on a locus of swinging movement substantially toward the front side of the vehicle, thereby allowing displacement of the tread of the vehicle pedal substantially toward the front side of the vehicle.

In the vehicle pedal displacement control structure according to the present invention, the stepping force transmission means includes: a stepping force transmission member projecting from the hydraulic pressure conversion means substantially toward the rear side of the vehicle; and a connecting member which connects a rear end of the stepping force transmission member and an upper end of a suspension-type vehicle pedal in a relatively rotatable manner.

In the vehicle pedal displacement control structure according to the present invention, the displacement control means includes: a swinging member which swings due to relative displacement of the members which constitute a portion of a vehicle body; and a pressing member provided integrally with the swinging member and pressing a portion of the stepping force transmission means substantially toward the front side of the vehicle due to swinging movement of the swinging member.

The operation of the present invention will be described hereinafter.

When the stepping force of the driver is applied to the tread of the suspension-type vehicle pedal which is swingably supported between the members which constitute a portion of a vehicle body, which the members being disposed apart from each other substantially in the longitudinal direction of the vehicle, and the vehicle pedal is thereby swung, the stepping force is transmitted via the stepping force transmission means to the hydraulic pressure conversion means. As a result, the stepping force applied to the tread of the vehicle pedal is transmitted by the stepping force transmission means to the hydraulic pressure conversion means and is also converted by the hydraulic pressure conversion means to hydraulic pressure.

Here, when an external force of a predetermined value or greater is applied to the front of the vehicle, relative displacement occurs between the members which constitute a portion of a vehicle body to reduce the distance therebetween substantially in the longitudinal direction of the vehicle. In this case, according to the present invention, the displacement control means disposed between the members which constitute a portion of a vehicle body is swung due to the relative displacement of the members which constitute a portion of a vehicle body substantially in the longitudinal direction of the vehicle. For this reason, a portion of the stepping force transmission means disposed on a locus of swinging movement of the displacement control means is pressed by the displacement control means substantially toward the front side of the vehicle. As a result, the tread of the vehicle pedal is displaced substantially toward the front side of the vehicle.

In addition, by adjusting a lever ratio between a radius of oscillation along which the displacement control means swinging due to the relative displacement of the members constituting a portion of a vehicle body is moved and a pressing radius along which a portion pressing a portion of the stepping force transmission means is moved, the pressing force can be set at a desired value.

Further, the above-described stepping force transmission means includes the stepping force transmission member projecting from the hydraulic pressure conversion means substantially toward the rear side of the vehicle, and the connecting member which connects a rear end of the stepping force transmission member and an upper end of a suspension-type vehicle pedal in a relatively rotatable manner. Therefore, with the stepping force transmission member being pressed by the displacement control means substantially toward the front side of the vehicle, the tread of the vehicle pedal can also be displaced substantially toward the front side of the vehicle. Further, with the connecting member being pressed by the displacement control means substantially toward the front side of the vehicle, the tread of the vehicle pedal can be displaced substantially toward the front side of the vehicle. Accordingly, a plurality of members such as the stepping force transmission member and the connecting member are provided to be pressed by the displacement control means substantially toward the front side of the vehicle.

Moreover, the above-described displacement control means includes the swinging member which swings due to relative displacement of the members which constitute a portion of a vehicle body, and the pressing member provided integrally with the swinging member and pressing a portion of the stepping force transmission means substantially toward the front side of the vehicle due to swinging movement of the swinging member. Therefore, by properly adjusting the position where the pressing member is provided with respect to the swinging member, the distance between a portion of the stepping force transmission means and the pressing member can be reduced. Accordingly, as compared with the case in which only the swinging member is provided and the portion of the stepping force transmission means is pressed by the swinging member itself, the portion of the stepping force transmission means can instantaneously be pressed substantially toward the front side of the vehicle.

DESCRIPTION OF THE PREFERRED EMBODIMENTS

A description will be hereinafter given of a first embodiment of the present invention with reference to FIGS. 1 and 2.

Figure 1:
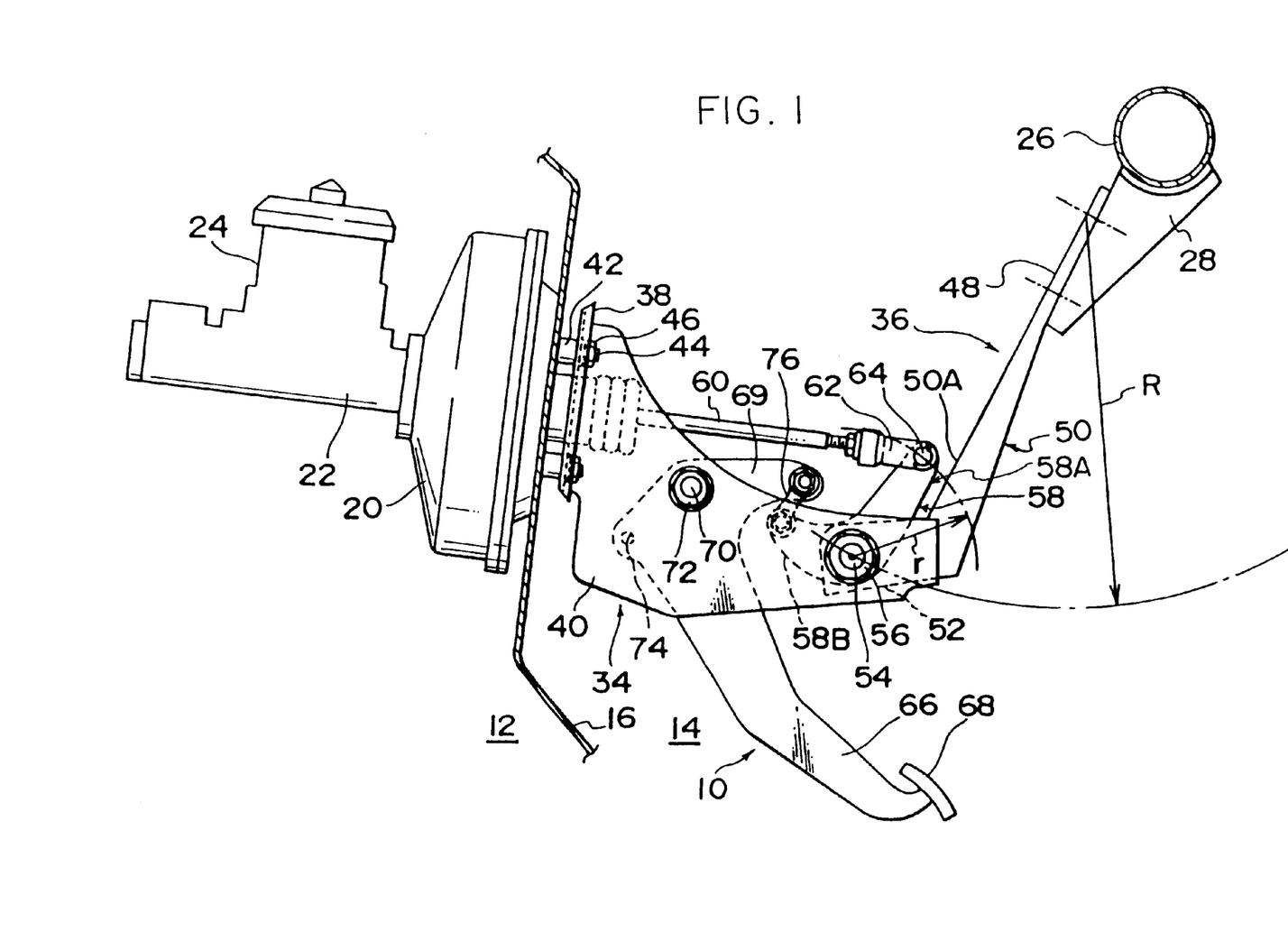
FIG. 1 is a side view which shows an overall construction of a vehicle pedal displacement control structure according to a first embodiment of the present invention.

FIG. 1 schematically shows a state of a peripheral structure of a suspension-type brake pedal 10 assembled. FIG. 2 shows the behavior of the brake pedal 10 when an external force of a predetermined value or greater is applied to the front of a vehicle. The overall structure of the peripheral structure including the brake pedal 10 will be hereinafter described with reference to these drawings.

A dash panel 16 is disposed substantially vertically at a position which partitions an engine room 12 from a vehicle interior space 14. An upper end portion of the dash panel 16 is fixed by spot welding or the like to the front side surface of a cowl inner panel (not shown) of which longitudinal direction coincides with the transverse direction of the vehicle and which forms a portion of a cowl. Further, a lower end portion of the dash panel 16 is fixed by spot welding or the like to a floor panel (not shown).

Disposed integrally at the vehicle front side of the dash panel 16 are a brake booster 20 for increasing the stepping force of a vehicle occupant (i.e., a driver), which is applied to the brake pedal 10, a master cylinder 22 for converting the pressure increased by the brake booster 20 to hydraulic pressure, and a reservoir tank 24 for storing and replenishing a brake fluid while following a change in the volume of a hydraulic pressure system.

A pipe-shaped instrument panel reinforce 26 which is made of a high strength member and of which longitudinal direction coincides with a substantially transverse direction of the vehicle is disposed at the vehicle rear side of the dash panel 16 and a support member 28 made of a high strength member is fixed by welding or the like to the lower side of the peripheral surface of the instrument panel reinforce 26. Meanwhile, the support member 28 projects in a state of being inclined at a predetermined angle substantially in the lower direction to the front side of the vehicle.

A pedal bracket is provided between the dash panel 16 and the support member 28 in such a manner as to be laid across a region between the dash panel 16 and the support member 28. The pedal bracket is formed by a main bracket 34 mounted at the side of the dash panel 16 and a sub-bracket 36 mounted at the side of the support member 28. In other words, the pedal bracket is divided into the main bracket 34 and the sub-bracket 36.

The main bracket 34 is structured to include a base plate portion 38 which forms a mounting surface for the dash panel 16, and a pair of side plate portions 40 extending parallel to each other from the vicinities of both side portions of the base plate portion 38 substantially rearward of the vehicle. A cylindrical collar 42 is fixed at each of four corners of the front side surface of the base plate portion 38. The base plate portion 38 is fixed to the dash panel 16 in such a manner that, with these collars 42 abutting against the dash panel 16, stud bolts 44 projecting from the brake booster 20 are respectively inserted into the collars 42 and nuts 46 are screwed to the stud bolts 44. A dash insulator (not shown) which is used as a sound insulating material is interposed between the dash panel 16 and the base plate portion 38.

The sub-bracket 36 is structured to include a plate-shaped mounting portion 48 mounted on the front surface of the support member 28, an extending portion 50 extending from the mounting portion 48 substantially downward toward the front side of the vehicle, and a pair of connecting portions 52 extending parallel to each other substantially toward the front side of the vehicle so as to be bent from the lower end of the extending portion 50. The mounting portion 48 is fixed to the support member 28 by fastening means such as bolts and nuts at positions indicated by the one-dot chain lines shown in FIG. 1, which are set separately from each other by a predetermined distance in the vertical direction of the vehicle. Further, no opening or the like is formed in a front surface portion 50A of the extending portion 50 and the extending portion 50 has a predetermined strength. On the other hand, a space is formed between the pair of connecting portions 52.

In the state in which the pair of connecting portions 52 of the sub-bracket 36 is inserted in a region between rear end portions of the pair of side plate portions 40 of the main bracket 34, the rear end portions of the side plate portions 40 and the front end portions of the connecting portions 52 are connected by a mounting bolt 54 and nuts 56. As a result, the main bracket 34 and the sub-bracket 36 are integrated with each other to form the pedal bracket.

Meanwhile, in the above state, a predetermined frictional force is generated between the rear end portions of the side plate portions 40 and the front end portions of the connecting portions 52 by fastening force of the mounting bolt 54 and the nuts 56. For this reason, there is no possibility that the main bracket 34 and the sub-bracket 36 rotate relatively to each other. However, so long as an external force of a predetermined value or greater is applied to the front of the vehicle and a pressing load acting substantially rearward of the vehicle and inputted via the main bracket 34 to the sub-bracket 36 exceeds the above-described frictional force, the main bracket 34 and the sub-bracket 36 are provided to be relatively rotatable.

An intermediate portion of a substantially V-shaped swing link 58 is rotatably supported at an intermediate portion of the mounting bolt 54 in the axial direction. The end of a long arm portion 58A of the swing link 58 is connected to a tip portion of a push rod (operating rod) 60 projecting from a shaft center portion of the brake booster 20. Specifically, a clevis 62 having a substantially U-shaped cross-sectional configuration is mounted at the tip portion of the push rod 60 and the end of the long arm portion 58A of the swing link 58 is inserted in the inner side of the clevis 62. In this state, when a clevis pin 64 passes through both side portions of the clevis 62 and also the end of the long arm portion 58A of the swing link 58 and a β-pin is inserted in and fastened at the end of the passing clevis pin 64, the tip portion of the push rod 60 and the end of the long arm portion 58A of the swing link 58 are connected in such a manner as to be relatively rotatable.

The suspension-type brake pedal 10 having a predetermined shape as a vehicle pedal is disposed substantially at the vehicle front side of a short arm portion 58B of the swing link 58. The brake pedal 10 is disposed between the pair of side plate portions 40 of the main bracket 34 and is structured to include a pedal supporting portion 66 bent in an appropriate shape, a pedal pad 68 provided at the lower end of the pedal supporting portion 66 and used as the tread to which stepping force of the driver is applied, and a rearward extending portion 69 which extends from the upper end of the pedal supporting portion 66 substantially rearward of the vehicle.

The upper end of the pedal supporting portion 66 is rotatably supported by a mounting bolt 70 and a nut 72. Specifically, a substantially cylindrical pedal boss (not shown) is fitted into a through hole formed at the upper end of the pedal supporting portion 66 and substantially cylindrical bushes are respectively fitted to both ends of the pedal boss. After cylindrical collars are inserted into the bushes, the mounting bolt 70 is inserted from the outer side of one of the side plate portions 40 and is screwed with the nut 72 from the outer side of the other side plate portion 40, thereby allowing the pedal supporting portion 66 of the brake pedal 10 to be rotatably supported.

A small hole 74 is formed at the side of the upper front end of the pedal supporting portion 66 and one end of a return spring (not shown), of which another end is fastened at a predetermined position on the side plate portion 40, is engaged with and fastened at the small hole 74. As a result, the brake pedal 10 is constantly urged in the direction of the pedal returning to its initial position.

Further, the end of the rearward extending portion 69 which extends from the upper end of the pedal supporting portion 66 substantially rearward of the vehicle is positioned at the upper side of the end of the short arm portion 58B of the swing link 58. The end of the rearward extending portion 69 and the end of the short arm portion 58B of the swing link 58 are connected by a connecting link 76 in a relatively rotatable manner.

Moreover, a radius of oscillation R which is a distance between a connecting point of the sub-bracket 36 and the support member 28 (located near the instrument panel reinforce 26) and a connecting point of the sub-bracket 36 and the main bracket 34 is set to be greater than a pressing radius r which is a distance between the connecting point of the sub-bracket 36 and the main bracket 34 and a position on the front surface portion 50A of the extending portion 50, where the end of the push rod 60 (i.e., the end of the clevis 62) is pressed.

Next, the operation and effect of the present embodiment will be described.

An ordinary braking operation will be first mentioned briefly. When the driver applies stepping force to the pedal pad 68 of the brake pedal 10, the brake pedal 10 is swung around the mounting bolt 70 substantially toward the front of the vehicle. For this reason, the rearward extending portion 69 of the brake pedal 10 rotates around the mounting bolt 70 in the clockwise direction in FIG. 1. Accordingly, the end of the short arm portion 58B of the swing link 58 is pushed by the connecting link 76 and the swing link 58 is swung around the mounting bolt 54 in the counterclockwise direction in FIG. 1. As a result, the end of the long arm portion 58A of the swing link 58 swings around the mounting bolt 54 in the counterclockwise direction and the push rod 60 is pushed substantially toward the front side of the vehicle. When the push rod 60 is pushed substantially toward the front side of the vehicle, the stepping force of the driver applied to the pedal pad 68 is increased by the brake booster 20 and is converted to hydraulic pressure by the master cylinder 22. Namely, the stepping force applied to the pedal pad 68 of the brake pedal 10 is transmitted to the brake booster 20 and also to the master cylinder 22 via the connecting link 76, the swing link 58, and the push rod 60 and is converted to a predetermined hydraulic pressure.

Here, when, in an ordinary state shown in FIG. 1 (with the brake pedal 10 held in its original position), an external force of a predetermined value or greater is applied to the front of the vehicle, the load at that time is inputted to the dash panel 16 via the master cylinder 22 and the brake booster 20. As a result, as shown in FIG. 2, the dash panel 16 may be displaced substantially toward the rear side of the vehicle. In this case, accompanied with the rearward displacement of the dash panel 16, the load is also inputted via the pedal bracket 34, 36 to the support member 28 and also to the instrument panel reinforce 26. However, the instrument panel reinforce 26 and the support member 28 are both high strength members, and therefore, these members are hardly displaced substantially toward the rear side of the vehicle. Consequently, the relative displacement of the dash panel 16 with respect to the instrument panel reinforce 26 and the support member 28 is caused so as to reduce the distance between the instrument panel 26 and the support member 28, and the dash panel 16 substantially in the longitudinal direction of the vehicle.

Figure 2:
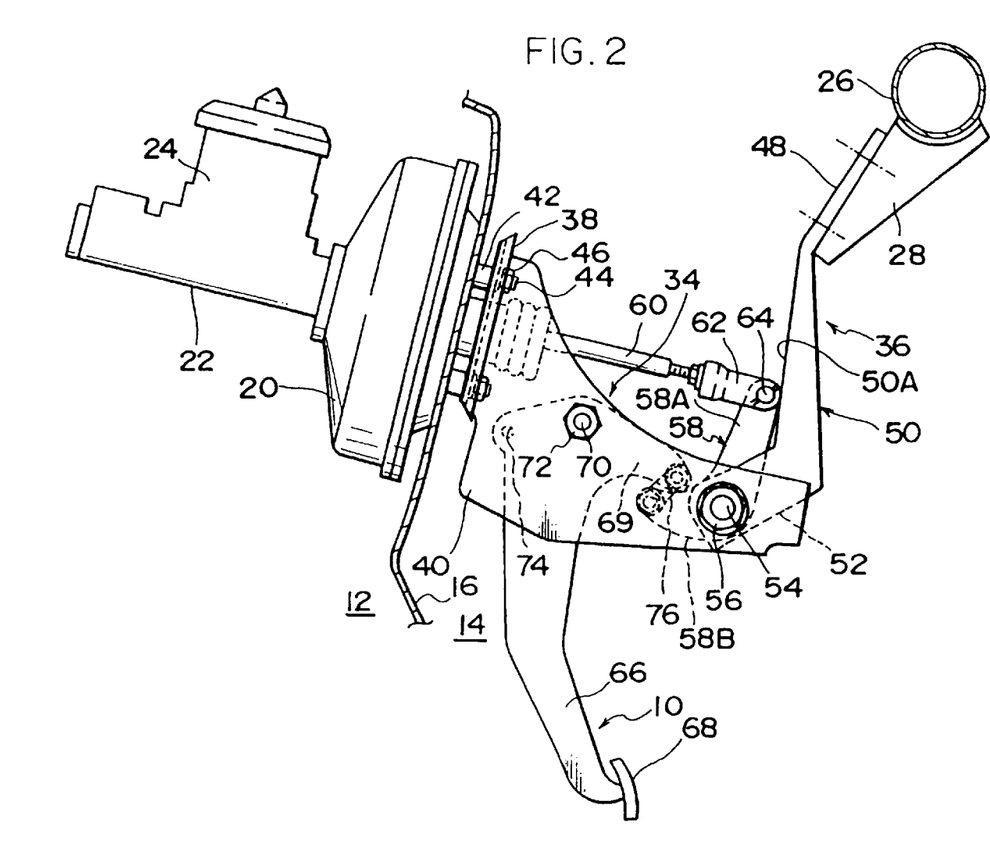
FIG. 2 is a side view which shows a state of the structure shown in FIG. 1 after an external force of a predetermined value or greater is applied to the front of a vehicle.

In this case, as shown in FIG. 2, the pressing force acting substantially toward the rear side of the vehicle with the rearward displacement of the main bracket 34 is inputted from the rear end of the side plate portion 40 to the front end of the connecting portion 52 of the sub-bracket 36. For this reason, with the sub-bracket 36 plastically deforming to bend at the position where the mounting portion 48 and the extending portion 50 are connected and also rotating around the mounting bolt 54, the sub-bracket 36 is swung substantially toward the rear side of the vehicle with the connecting position as the starting point. Accordingly, the front surface portion 50A of the sub-bracket 36 is displaced relatively substantially toward the front side of the vehicle and abuts against the end of the push rod 60 (i.e., the end of the clevis 62). Moreover, as the amount by which the sub-bracket 36 swings increases, the front surface portion 50A continues to push to force in the push rod 60 substantially toward the front side of the vehicle. As a result, the swing link 58 connected to the end of the push rod 60 is swung around the mounting bolt 54 in the counterclockwise direction, and accompanied therewith, the rearward extending portion 69 of the brake pedal 10 is pulled into the substantially lower side of the vehicle via the connecting link 76. Consequently, with the brake pedal 10 being swung around the mounting bolt 70 in the clockwise direction, the pedal pad 68 can be displaced substantially in the forward longitudinal direction of the vehicle.

In other words, according to the present embodiment, when an external force of a predetermined value or greater is applied to the front of the vehicle, the pedal pad 68 of the brake pedal 10 can be controlled so as to be displaced substantially toward the front side of the vehicle. As a result, when an external force of a predetermined value or greater is applied to the front of the vehicle, bending of the knees of the driver due to the inertial movement of the driver can be suppressed and the knees of the driver can be kept away from a steering column. Accordingly, protection abilities for driver's legs, for example, driver's knees can be improved.

In addition, according to the present embodiment, the radius of oscillation R of the sub-bracket 36 is set to be greater than the pressing radius r of the push rod 60, and based on a lever ratio, r/R, corresponding thereto, the push rod 60 can be pushed substantially toward the front side of the vehicle. In other words, by arbitrarily adjusting the lever ratio between the radius of oscillation R and the pressing radius r, force of pushing the push rod 60 substantially toward the front side of the vehicle can be set at a desired value. Accordingly, the present embodiment allows the pedal pad 68 of the brake pedal 10 to be reliably displaced substantially toward the front side of the vehicle.

Further, according to the present embodiment, stepping force transmission means for transmitting the stepping force of the driver applied to the pedal pad 68 of the brake pedal 10 to the brake booster 20 and also to the master cylinder 22 is formed by the push rod 60 projecting from the brake booster 20 substantially toward the rear side of the vehicle, and the swing link 58 and the connecting link 76, which connect the end of the push rod 60 and the rearward extending portion 69 of the suspension-type brake pedal 10 in a relatively rotatable manner. Accordingly, as described above, the end of the push rod 60 (i.e., the end of the clevis 62) is pushed by the front surface portion 50A of the extending portion 50 of the sub-bracket 36 substantially toward the front side of the vehicle, and the pedal pad 68 can thereby be displaced substantially toward the front side of the vehicle. Further, different from the foregoing, the end side of the long arm portion 58A of the swing link 58 is pushed by the front surface portion 50A of the extending portion 50 of the sub-bracket 36 substantially toward the front side of the vehicle, and the pedal pad 68 can thereby be displaced substantially toward the front side of the vehicle. Accordingly, a plurality of members, for example, the push rod 60 including the clevis 62, and the swing link 58 are provided to be pushed by the sub-bracket 36 substantially toward the front side of the vehicle. As a result, the present embodiment allows improvement of degree of freedom from the view point of structure (layout).

A description will be hereinafter given of a second embodiment of the present invention with reference to FIGS. 3 and 4. It should be noted that the same members as those of the first embodiment will be denoted by the same reference numerals, and a description thereof will be omitted.

Figure 3:
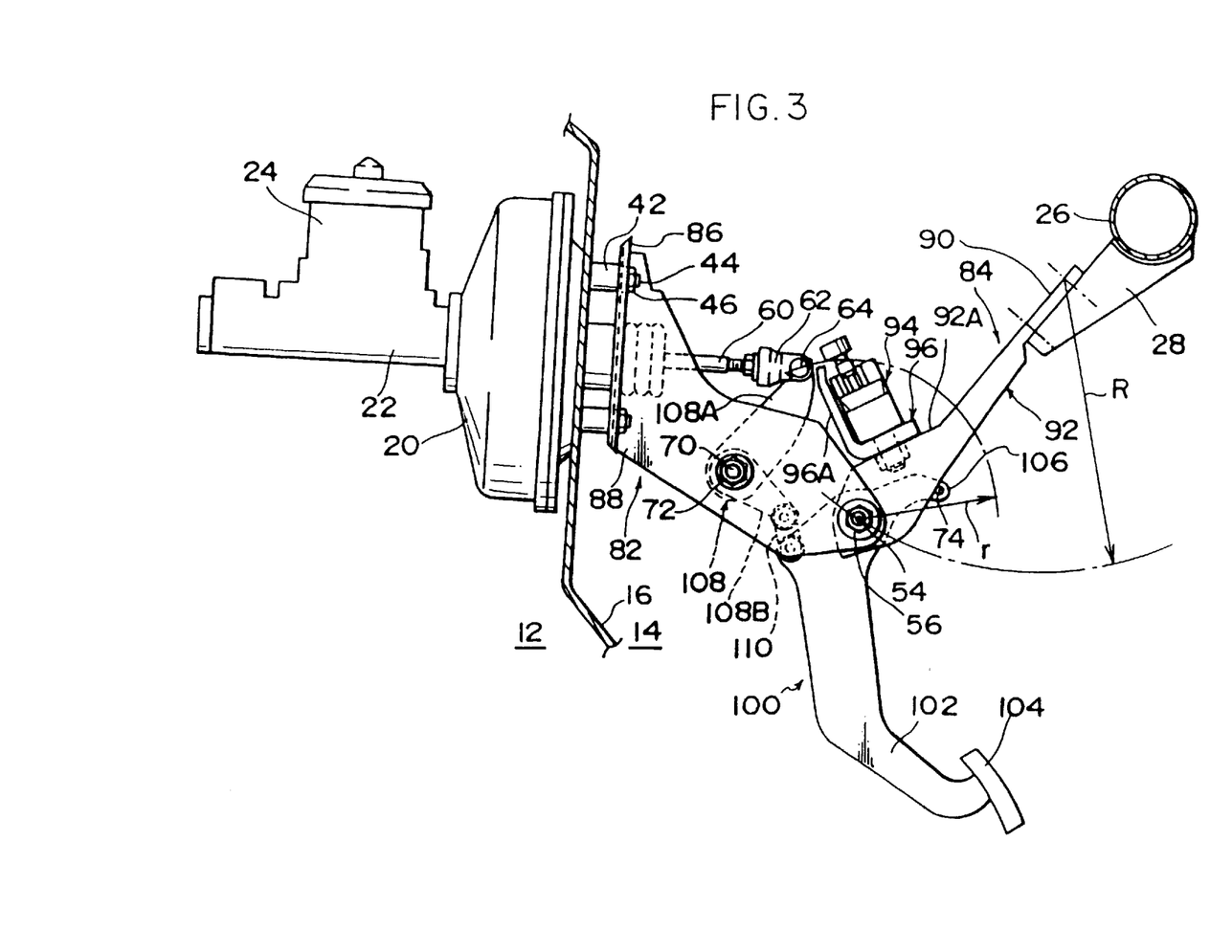
FIG. 3 is a side view which shows an overall structure of a vehicle pedal displacement control structure according to a second embodiment of the present invention.
Figure 4:
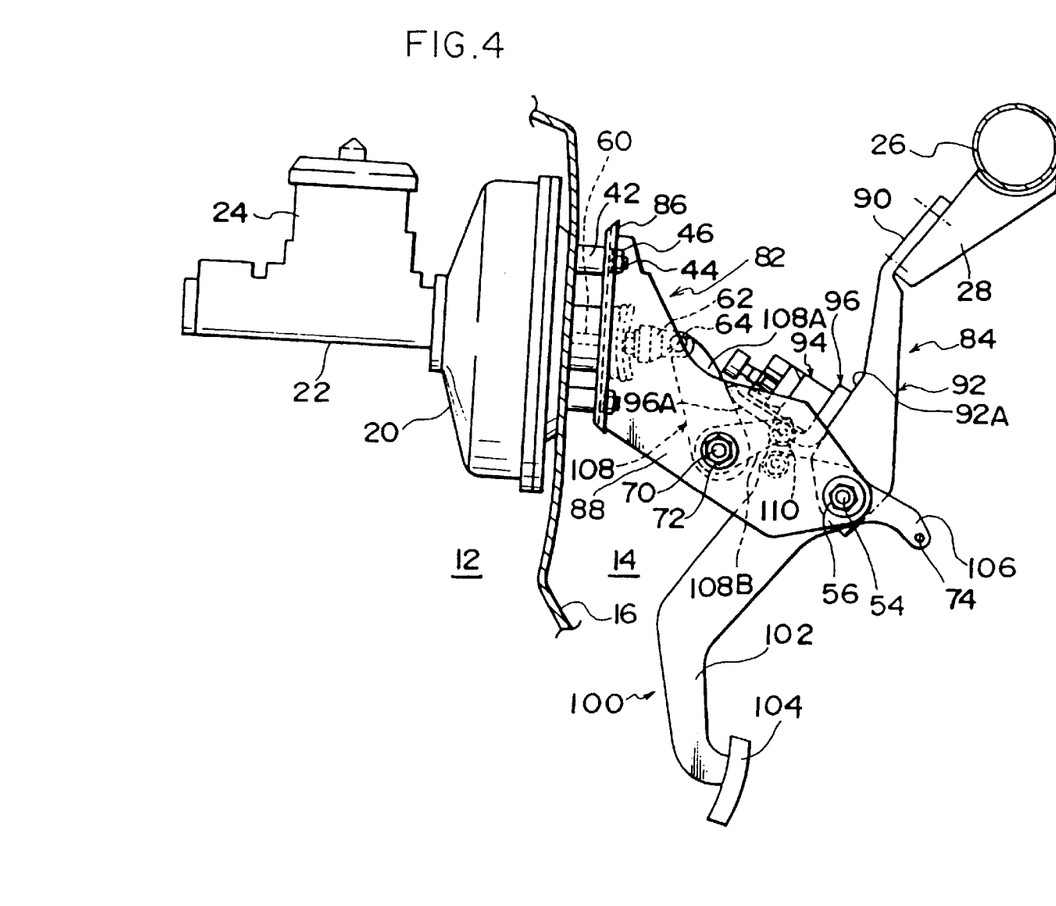
FIG. 4 is a side view which shows a state of the structure shown in FIG. 3 after an external force of a predetermined value or greater is applied to the front of a vehicle.

As shown in FIGS. 3 and 4, in this embodiment as well, a pedal bracket is divided into a main bracket 82 and a sub-bracket 84. Although the main bracket 82 has a slightly different shape from that of the first embodiment, it is formed by a base plate portion 86 and a pair of side plate portions 88 in the same way as in the first embodiment. The sub-bracket 84 is formed by a mounting portion 90 mounted to the support member 28 and an extending portion 92 which extends from the mounting portion 90 substantially downward toward the front side of the vehicle. The front lower end of the extending portion 92 is opened. Further, a brake switch 94 is mounted on the front upper surface 92A of the extending portion 92. A pressing member 96 having a substantially L-shaped configuration in side view is fixed to be held between the brake switch 94 and the front upper surface 92A of the extending portion 92.

Further, the brake pedal 100 includes a pedal supporting portion 102, a pedal pad 104, and a rearward extending portion 106 in the same way as in the above-described first embodiment. However, in this embodiment, the brake pedal 100 is swingably supported by the mounting bolt 54 which connects the main bracket 82 and the sub-bracket 84. In this state, a substantially V-shaped swing link 108 corresponding to the swing link 58 of the first embodiment is swingably supported by the mounting bolt 70 at the side of the main bracket 82.

The end of a long arm portion (upper end portion) 108A of the swing link 108 is connected to the clevis 62 at the end of the push rod 60 in a relatively rotatable manner. Further, the end of a short arm portion (lower end portion) 108B of the swing link 108 is connected to the upper front end of the brake pedal 100 via a connecting link 110. Additionally, in the present embodiment, the swing link 108 is formed as an integrated member and is also formed in such a manner that a predetermined distance between the long arm portion 108A and the short arm portion 108B in the thickness direction thereof is provided. However, this structure needs not necessarily to be provided and the swing link 108 may also be structured in such a manner that the long arm portion 108A and the short arm portion 108B are formed separately and integrated to prevent relative rotation therebetween.

Further, an upright portion 96A of the pressing member 96 is disposed at the front side of the brake switch 94 and is also disposed in the vicinity of and slightly apart from the end of the long arm portion 108A of the swing link 108 (i.e., near the clevis 62 at the end of the push rod 60).

Moreover, in this embodiment as well, in the same way as in the above-described first embodiment, a radius of oscillation R which is the distance between a connecting point of the sub-bracket 84 and the support member 28 (located near the instrument panel reinforce 26) and a connecting point of the sub-bracket 84 and the main bracket 82 is set to be made greater than a pressing radius r which is the distance between the connecting point of the sub-bracket 84 and the main bracket 82 and the pressing member 96 by which the end of the long arm portion 108A of the swing link 108 is pushed.

The above-described structure can also obtain the same operation as that of the first embodiment. In brief, although the dash panel 16 is displaced substantially toward the rear side of the vehicle (from the state shown in FIG. 3 to the state shown in FIG. 4), the side of the instrument panel reinforce 26 is hardly displaced rearward. As a result, relative displacement of the dash panel 16 with respect to the instrument panel reinforce 26 and the support member 28 is caused so as to reduce the distance therebetween substantially toward the rear side of the vehicle.

In this case, as shown in FIG. 4, when pressing force acting substantially toward the rear side of the vehicle accompanied with the rearward displacement of the main bracket 82 is inputted from the rear end of the side plate portions 88 to the front end of the extending portion 92 of the sub-bracket 84 and the sub-bracket 84 plastically deforms to bend at the position where the mounting portion 90 and the extending portion 92 are connected together and also rotates around the mounting bolt 54, the sub-bracket 84 is swung substantially toward the rear side of the vehicle with the connecting position as the starting point. For this reason, the end of the upright portion 96A of the L-shaped pressing member 96 fixed to the front upper surface 92A of the sub-bracket 84 abuts against the vicinity of the position on the rear end surface of the swing link 108 with the clevis 62 connected thereto. Further, as the amount by which the sub-bracket 84 swings increases, the upright portion 96A of the pressing member 96 continues to push the rear end surface of the end of the long arm portion 108A of the swing link 108 substantially toward the front side of the vehicle and the push rod 60 is thereby forced in substantially toward the front side of the vehicle.

Accordingly, the swing link 108 connected to the end of the push rod 60 is swung around the mounting bolt 70 in the counterclockwise direction, and accompanied therewith, the upper front end of the brake pedal 100 is pulled via the connecting link 110 substantially toward the upper side of the vehicle. As a result, in this embodiment as well, the brake pedal 100 is swung around the mounting bolt 54 in the clockwise direction so as to allow displacement of the pedal pad 104 substantially in the forward direction of the vehicle and further allow the knees of the driver's legs to be kept away from the steering column. Accordingly, protection abilities for the driver's legs, for example, the driver's knees can be improved.

In addition, in this embodiment as well, the radius of oscillation R of the sub-bracket 84 is set to be greater than the pressing radius r for the push rod 60, and based on a corresponding lever ratio, r/R, the push rod 60 is pushed substantially toward the front side of the vehicle. For this reason, by adjusting the lever ratio so that the pressing force is set at a desired value, the pedal pad 104 of the brake pedal 100 can reliably be displaced substantially toward the front side of the vehicle.

Further, in this embodiment as well, the stepping force transmission means for transmitting the stepping force of the driver applied to the pedal pad 104 of the brake pedal 100 to the brake booster 20 and also to the master cylinder 22 is formed by the push rod 60 projecting from the brake booster 20 substantially toward the rear side of the vehicle, and is also formed by the swing link 108 and the connecting link 110, which connect the end of the push rod 60 and the upper front end of the suspension-type brake pedal 110 in a relatively rotatable manner. Accordingly, as described above, the end of the long arm portion 108A of the swing link 108 is pushed substantially toward the front side of the vehicle so as to allow displacement of the pedal pad 104 substantially toward the front side of the vehicle. Further, different from the aforementioned, by continuing to push the end of the push rod 60 (namely, the end of the clevis 62) due to an increase of the amount by which the upright portion 96A extends substantially upward of the vehicle, the pedal pad 104 can be displaced substantially toward the front side of the vehicle. Accordingly, a plurality of members, for example, the push rod 60 including the clevis 62, and the swing link 108 are provided to be pushed by the sub-bracket 84 substantially toward the front side of the vehicle. As a result, in this embodiment as well, in the same way as in the first embodiment, the degree of freedom from the view point of structure (layout) can be improved.

In addition, according to this embodiment, displacement control means is structured to include the sub-bracket 84 which swings due to relative displacement occurring between the dash panel 16 and the instrument panel reinforce 26 and also include the pressing member 96 formed integrally with the sub-bracket 84 and pushing the end of the long arm portion 108A of the swing link 108 substantially toward the front side of the vehicle due to the sub-bracket 84 swinging. For this reason, by properly adjusting the position where the pressing member 96 is disposed and the shape thereof, the distance between the pressing member 96, and the end of the long arm portion 108A of the swing link 108 or the end of the push rod 60 can be shortened. Accordingly, as compared with the case in which the end of the long arm portion 108A of the swing link 108 or the end of the push rod 60 is pushed by the sub-bracket 84 itself, these members can instantaneously be pressed substantially toward the front side of the vehicle. As a result, when an external force of a predetermined value or greater is applied to the front of the vehicle, the pedal pad 104 of the brake pedal 100 can instantaneously be displaced substantially toward the front side of the vehicle.

Some supplementary descriptions of "radius of oscillation R" and "pressing radius r" will be given hereinafter.

In either embodiment, the sub-brackets 36, 84 bend with the vicinities of the positions, as the starting points, where the mounting portions 48, 90 are respectively connected to the extending portions 50, 92 and are swung substantially rearward of the vehicle, and it may be considered that the radius of oscillation R is the distance between the position where the mounting bolt 54 is disposed and each of the above-described connecting positions. However, there is a possibility that the positions where the sub-brackets 36, 84 are bent or the points where the mounting portions 48, 90 are fastened may vary due to the shape of the support member 28, and the like, and therefore, it may also be considered that setting of the radius of oscillation R with an outermost fastening point provided as a reference among the points where the mounting portions 48, 90 of the sub-brackets 36, 84 are fastened to the support member 28 is conceptually proper. In this specification, the latter setting of the radius of oscillation R is employed.

Further, the pressing radius r indicates the distance between the position where the mounting bolt 54 is disposed, and an actually pressing member (i.e., the pressing member 96) or an actually pressed position (i.e., a predetermined position on the front surface 50A of the extending portion 50).

Next, some supplementary descriptions will be given of the relations between components described in the above-described embodiments and components described in the claims of the present invention.

The dash panel 16, and the instrument panel reinforce 26 and the support member 28, which are disposed apart from each other substantially in the longitudinal direction of the vehicle and each correspond to "member which constitutes a portion of a vehicle body". For convenience sake, the dash panel 16 is recognized as a first member which constitutes a portion of a vehicle body and the instrument panel reinforce 26 and the support member 28 are recognized as a second member which constitutes a portion of a vehicle body.

Further, the brake booster 20 and the master cylinder 22 correspond to "liquid pressure conversion means". However, when the present invention is applied to a clutch pedal, a clutch master cylinder corresponds to the liquid pressure conversion means.

Moreover, the connecting link 76 (or the connecting link 110), the swing link 58 (or the swing link 108), and the push rod 60 each correspond to "stepping force transmission means", and the push rod 60 corresponds to "stepping force transmission member" and the connecting links 76, 110 and the swing links 58, 108 each correspond to "connecting member".

Further, in the first embodiment, the sub-bracket 36 corresponds to "displacement control means". In the second embodiment, the sub-bracket 84 and the pressing member 96 correspond to "displacement control means". Moreover, in the second embodiment, the sub-bracket 84 corresponds to "swinging member", and the pressing member 96 corresponds to "pressing member".

In the above-described embodiments, the pedal bracket 30 is divided into two parts, i.e., the main bracket 34 and the sub-bracket 36, and the pedal bracket 80 is also divided into the main bracket 82 and the sub-bracket 84. However, the present invention is not limited to the same and a pedal bracket may be formed integrally to have a substantially V-shaped configuration in side view with front and rear portions of the pedal bracket plastically deforming to reduce the relative distance therebetween.

Further, in the above-described embodiments, the connecting links 76, 110 are used. However, these connecting links need not necessarily be provided and may be omitted.

Moreover, in the above-described embodiments, the present invention is applied to a suspension-type main brake pedal. However, the present invention is not limited to the same and can also be applied to a suspension-type clutch pedal or the like.

The vehicle pedal displacement control structure according to the present invention is disposed between members which constitute a portion of a vehicle body, which are provided away from each other substantially in the longitudinal direction of the vehicle and displaced relatively so as to reduce the distance therebetween substantially in the longitudinal direction of the vehicle due to an external force of a predetermined value or greater being applied to the front of the vehicle. Further, the vehicle pedal displacement control structure includes displacement control means which swings due to relative displacement occurring between the members which constitute a portion of a vehicle body and presses a portion of stepping force transmission means disposed on a locus of swinging movement substantially toward the front of the vehicle, thereby allowing a tread of the vehicle pedal to be displaced substantially toward the front of the vehicle. For this reason, when an external force of a predetermined value or greater is applied to the front of the vehicle, displacement of the tread of the vehicle pedal can be controlled.

In addition, according to the present invention, by adjusting a lever ratio between a radius of oscillation along which the displacement control means which swings due to the relative displacement of the members which constitute a portion of a vehicle body is moved and a pressing radius along which a portion of the displacement control means pressed by a portion of the stepping force transmission means is moved, the pressing force can be set at a desired value. For this reason, the tread of the vehicle pedal can reliably be displaced substantially toward the front of the vehicle.

In the vehicle pedal displacement control structure according to the present invention, the stepping force transmission means is structured to include a stepping force transmission member projecting from the hydraulic pressure conversion means substantially rearward of the vehicle, and a connecting member which connects the rear end of the stepping force transmission member and the upper end of the suspension-type vehicle pedal in a relatively rotatable manner. For this reason, a plurality of members are provided to be pressed substantially toward the front of the vehicle by the displacement control means, thereby resulting in an increase of the degree of freedom from the view point of structure (layout).

In the second embodiment of the present invention, the displacement control means is structured to include a swinging member which swings due to relative displacement occurring between the members which constitute a portion of a vehicle body and also include a pressing member formed integrally with the swinging member and pressing a portion of the stepping force transmission means due to the swinging movement of the swinging member. For this reason, as compared with the case in which only the swinging member is provided and the portion of the stepping force transmission means is pressed by the swinging member itself, the portion of the stepping force transmission means can instantaneously be pressed substantially toward the front of the vehicle. As a result, when an external force of a predetermined value or greater is applied to the front of the vehicle, the tread of the vehicle pedal can instantaneously be displaced substantially toward the front of the vehicle.

What is claimed is:

1. A vehicle pedal displacement control structure, comprising:
   a suspended vehicle pedal which is swingably supported by a bracket extending between a substantially vertical wall and a reinforcement support member which constitute a portion of a vehicle, the wall and the support member which constitute the portion of the vehicle are disposed apart from each other substantially in the longitudinal direction of the vehicle and are displaced relatively so as to reduce a distance therebetween substantially in the longitudinal direction of the vehicle when an external force of a predetermined value or greater is applied to the front of the vehicle, said vehicle pedal including, at a lower end thereof, a tread to which stepping force of a driver is applied;

stepping force transmission means for connecting said vehicle pedal and hydraulic pressure conversion means for converting the stepping force applied to the tread to hydraulic pressure to transmit the stepping force to the hydraulic pressure conversion means; and displacement control means disposed between the the wall and the support member which constitute the portion of the vehicle, said displacement control means swinging due to relative displacement of the wall and the support member which constitute the portion of the vehicle and pressing a portion of said stepping force transmission means disposed on a locus of swinging movement substantially toward the front side of the vehicle, thereby allowing displacement of the tread of said vehicle pedal substantially toward the front side of the vehicle, wherein the displacement control means includes the bracket, the bracket having a first part mounted at one end to the wall and a second part mounted to the support member at one end, the first part and the second part being pivotally mounted at their respective other ends to each other, and a lever ratio between a radius of oscillation along which said second part is moved and a pressing radius along which a pressed portion of said stepping force transmission means is moved can be adjusted.

2. A vehicle pedal displacement control structure according to claim 1, wherein said first part pivotally supports said vehicle pedal.

3. A vehicle pedal displacement control structure according to claim 1, wherein said second part swings due to relative displacement of the wall and the support member which constitute the portion of the vehicle and comprises a pressing member provided integrally with said second part that presses a portion of said stepping force transmission means substantially toward the front side of the vehicle due to the swinging movement of said second part.

4. A vehicle pedal displacement control structure according to claim 1, wherein said stepping force transmission means includes:

a stepping force transmission member projecting from the hydraulic pressure conversion means substantially toward the rear side of the vehicle; and a connecting member which connects a rear end of said stepping force transmission member and an upper end of the suspended vehicle pedal in a relatively rotatable manner.

5. A vehicle pedal displacement control structure according to claim 4, wherein said connecting member includes a link mechanism.

6. A vehicle pedal displacement control structure according to claim 4, wherein said first part pivotally supports said vehicle pedal.

7. A vehicle pedal displacement control structure according to claim 6, wherein said connecting member includes a link mechanism.

8. A vehicle pedal displacement control structure according to claim 4, wherein said second part swings due to relative displacement of the wall and the support member which constitute the portion of the vehicle and comprises a pressing member provided integrally with said second part that presses a portion of said stepping force transmission means substantially toward the front side of the vehicle due to the swinging movement of said second part.

9. A vehicle pedal displacement control structure according to claim 8, wherein said connecting member includes a link mechanism.

10. A vehicle pedal displacement control structure mounted to a vehicle body, comprising:

a bracket including a main bracket mounted to a substantially vertical portion of the vehicle body and a sub-bracket;

a connector between the main bracket and the sub-bracket allowing the main bracket and the sub-bracket to pivot with respect to one another;

a support member mounted to a reinforcing member of the vehicle body, the support member disposed to the rear of the vertical portion in a longitudinal direction of the vehicle body, the sub-bracket fixedly attached to the support member at an end away from the connector pivotal connection with the main bracket;

a pedal suspended from a pivotal connection to the main bracket;

a swing link having a short arm and a long arm in a substantially V-shaped configuration pivotally mounted to the main bracket; and a connecting link extending between the short arm of the swing link and the pedal, wherein the long arm is pivotally attached to a force transmission member associated with the vertical portion and the swing link is pivotally mounted to the main bracket by the connector between the main bracket and the sub-bracket.

11. The vehicle pedal displacement control structure according to claim 10, wherein the pivotal connection of the pedal to the main bracket is forward of the connector in the longitudinal direction of the vehicle body.

12. The vehicle pedal displacement control structure mounted to a vehicle body, comprising:

a bracket including a main bracket mounted to a substantially vertical portion of the vehicle body and a sub-bracket;

a connector between the main bracket and the sub-bracket allowing the main bracket and the sub-bracket to pivot with respect to one another;

a support member mounted to a reinforcing member of the vehicle body, the support member disposed to the rear of the vertical portion in a longitudinal direction of the vehicle body, the sub-bracket fixedly attached to the support member at an end away from the connector pivotal connection with the main bracket;

a pedal suspended from a pivotal connection to the main bracket;

a swing link having a short arm and a long arm in a substantially V-shaped configuration pivotally mounted to the main bracket; and a connecting link extending between the short arm of the swing link and the pedal, wherein the long arm is pivotally attached to a force transmission member associated with the vertical portion and the pivotal connection of the pedal to the main bracket is provided by the connector between the main bracket and the sub-bracket.

13. The vehicle pedal displacement control system according to claim 12, wherein the pivotal mount of the swing link to the main bracket is forward of the pivotal connection of the pedal in the longitudinal direction of the vehicle body.

14. The vehicle pedal displacement control system according to claim 13, further comprising an upright portion extending from the sub-bracket toward the pivotal attachment of the force transmission member and the long arm.

* * * * *